United States Patent [19]
Griffen et al.

[11] Patent Number: 5,495,758
[45] Date of Patent: Mar. 5, 1996

[54] TACHOMETER ASSEMBLY WITH INTEGRAL INTERNAL WRENCH

[75] Inventors: Neil Griffen, Westerville; Mark Azyenberg, Columbus, both of Ohio

[73] Assignee: Lake Shore Cryotronics, Inc., Westerville, Ohio

[21] Appl. No.: 77,455

[22] Filed: Jun. 17, 1993

[51] Int. Cl.⁶ .................................................. G01P 1/04
[52] U.S. Cl. .................................. 73/493; 464/120
[58] Field of Search ............................ 73/493, 490, 431, 73/866.5, 527, 537, 494; 74/826, 813 L, 840; 464/53, 112, 120

[56] References Cited

U.S. PATENT DOCUMENTS

| | | | |
|---|---|---|---|
| 1,738,772 | 12/1929 | Harry . | |
| 3,636,767 | 1/1972 | Duffy | 73/229 |
| 3,764,888 | 10/1973 | Anderson | 324/161 |
| 3,774,457 | 11/1973 | Henss et al. | 73/493 |
| 3,911,237 | 10/1975 | Naito et al. | 73/493 |
| 3,997,782 | 12/1976 | Willits | 340/271 |
| 4,274,053 | 6/1981 | Ito et al. | 324/174 |
| 4,319,188 | 3/1982 | Ito et al. | 324/208 |
| 4,350,952 | 9/1982 | Holt et al. | 324/166 |
| 4,418,372 | 11/1983 | Hayashida et al. | 324/252 |
| 4,506,217 | 3/1985 | Rothley et al. | 324/208 |
| 4,639,807 | 1/1987 | Sekizawa et al. | 324/208 |
| 4,642,496 | 2/1987 | Kerviel et al. | 310/254 |
| 4,656,377 | 4/1987 | Akiyama et al. | 324/208 |
| 4,668,913 | 5/1987 | Vinal | 324/208 |
| 4,686,472 | 8/1987 | Van Ooijen et al. | 324/252 |
| 4,712,064 | 12/1987 | Eckardt et al. | 324/208 |
| 4,759,218 | 7/1988 | Rodi et al. | 73/493 |
| 4,766,376 | 8/1988 | Takahashi et al. | 324/208 |
| 4,786,870 | 11/1988 | Kawamata et al. | 324/208 |
| 4,800,457 | 1/1989 | Kryder et al. | 360/113 |
| 4,811,603 | 3/1989 | Bitetti | 73/493 |
| 4,816,948 | 3/1989 | Kamo et al. | 360/113 |
| 4,818,939 | 4/1989 | Takahashi et al. | 324/208 |
| 4,851,771 | 7/1989 | Ikeda et al. | 324/208 |
| 4,853,631 | 8/1989 | Carmen | 324/208 |
| 4,853,632 | 8/1989 | Nagano et al. | 324/208 |
| 4,857,841 | 8/1989 | Hastings et al. | 324/208 |
| 4,866,382 | 9/1989 | Carmen | 324/208 |
| 4,874,053 | 10/1989 | Kimura et al. | 180/79.1 |
| 4,890,059 | 12/1989 | Guentner | 73/518 |
| 4,914,387 | 4/1990 | Santos | 324/252 |
| 4,914,389 | 4/1990 | Juds | 324/207.21 |
| 4,922,197 | 5/1990 | Juds et al. | 324/207.21 |
| 4,947,690 | 8/1990 | Cleveland | 73/493 |
| 4,975,675 | 12/1990 | Becker | 338/32 R |
| 4,988,220 | 1/1991 | Christiansen et al. | 310/168 |
| 4,992,733 | 2/1991 | Griebler | 324/207.21 |
| 5,001,930 | 3/1991 | Glover et al. | 73/493 |
| 5,019,776 | 5/1991 | Kawamata et al. | 324/207.21 |
| 5,041,784 | 8/1991 | Griebeler | 324/207.21 |

*Primary Examiner*—Hezron E. Williams
*Assistant Examiner*—Helen C. Kwok
*Attorney, Agent, or Firm*—Nixon & Vanderhye

[57] ABSTRACT

In a tachometer assembly for attachment to an output shaft of a rotary machine, wherein the tachometer assembly includes a tachometer housing enclosing a sensor drum fixed to a tachometer shaft, the shaft extending from the tachometer housing and adapted for attachment to the output shaft of the rotary machine for rotation therewith, and a sensor pad located peripherally adjacent the sensor drum, an improvement which includes an internal wrench mechanism for locking the tachometer shaft to the tachometer housing for common rotation therewith so as to facilitate threaded engagement between the tachometer shaft and the output shaft, as well as for unlocking the tachometer shaft from the tachometer housing for rotation relative to the tachometer housing to thereby permit the tachometer shaft to rotate with the output shaft after the tachometer housing is secured to the rotary machine housing.

16 Claims, 4 Drawing Sheets

5,495,758

TACHOMETER ASSEMBLY WITH INTEGRAL INTERNAL WRENCH

This invention relates to tachometers for measuring angular velocity of a rotating shaft and, in particular, to a novel manner of attachment of the shaft of a tachometer assembly to the rotor of a rotating machine, such as a motor.

BACKGROUND AND SUMMARY OF THE INVENTION

Generally, tachometer assemblies are assembled to a rotating machine by first attaching the tachometer shaft to the machine rotor, and then securing the tachometer housing to the machine housing, or vice versa. In either case, a persistent problem exists, however, in those instances where the machine rotor is located at the bottom of a blind hole in the machine housing, since there is insufficient space to locate tools, such as wrenches and the like, which are otherwise used to affix the tachometer shaft to the rotor.

This invention solves the problem by incorporating an "internal wrench" into the tachometer assembly. By proper manipulation of the tachometer shaft, the latter may be locked to the tachometer housing in an installation mode so that the shaft can be screwed directly into a threaded bore in the rotor simply by rotating the entire tachometer assembly. Then, by further manipulation of the tachometer housing, the tachometer shaft can be released so that the tachometer housing can be secured to the machine housing, with the tachometer shaft free to rotate with the rotor in an operative mode.

In an exemplary embodiment of the invention, a tachometer assembly includes a main body and a cover which may be joined together to form the tachometer housing which encloses a PC board assembly, a sensor pad, and a rotatable shaft/drum assembly. The drum periphery has indicia thereon which are sensed by the sensor pad, from which signals are generated to provide an accurate reading of the rotation of the rotor or motor shaft (hereinafter referred to simply as "the" rotor for convenience) via its axial connection to the tachometer shaft. In accordance with this invention, the tachometer shaft and drum assembly may be pulled forwardly so that the shaft extends out of the main body of the tachometer a distance greater than normal to facilitate installation. In this extended position, also referred to herein as an installation mode, the tachometer shaft can be locked to the main body portion of the housing via an internal wrench mechanism, so that by rotating the tachometer housing, the tachometer shaft will rotate therewith. In this installation mode, the tachometer shaft may be properly aligned in the blind hole with a threaded bore in the rotor, and threadably engaged therewith via manual rotation of the tachometer housing itself which, of course, remains outside the blind hole. Once the tachometer shaft is fully threaded into the rotor, the tachometer shaft may be released to permit axial as well as rotational movement relative to the tachometer housing, so that the tachometer housing may be moved forwardly and fixedly secured to the motor housing, leaving the tachometer shaft free to rotate with the rotor.

In its broader aspects, therefore, the present invention relates to a tachometer assembly for attachment to an output shaft of a rotary machine, wherein the tachometer assembly includes a housing enclosing a sensor fixed to a tachometer shaft, the shaft extending from the tachometer housing adapted for attachment to the output shaft of the rotary machine for rotation therewith, and a sensor pad located peripherally adjacent the sensor, the improvement comprising an internal wrench means for locking the tachometer shaft to the tachometer housing for common rotation therewith so as to facilitate engagement between the tachometer shaft and the output shaft, and for unlocking the tachometer shaft from the tachometer housing for rotation relative to the tachometer housing to thereby permit the tachometer shaft to rotate with the output shaft after the tachometer housing is secured to the rotary machine housing.

In another aspect, the invention relates to a tachometer assembly for attachment to a rotor of a rotary machine comprising a tachometer housing enclosing a sensor and associated sensor pad, the sensor fixed to a tachometer shaft projecting from the tachometer housing, the shaft provided with a transverse drive pin engageable within a pair of recesses formed in the tachometer housing so as to releasably, rotationally and axially lock the tachometer shaft to the housing in an installation mode, the drive pin also disengageable from the pair of recesses so as to release the tachometer shaft for rotation relative to the tachometer housing in an operative mode.

The invention is thus seen to provide a simple solution to an otherwise difficult problem through the incorporation of an internal wrench into a tachometer assembly.

Additional advantages of the present invention will become apparent from the detailed description which follows.

DETAILED DESCRIPTION OF THE DRAWINGS

Figure 1:
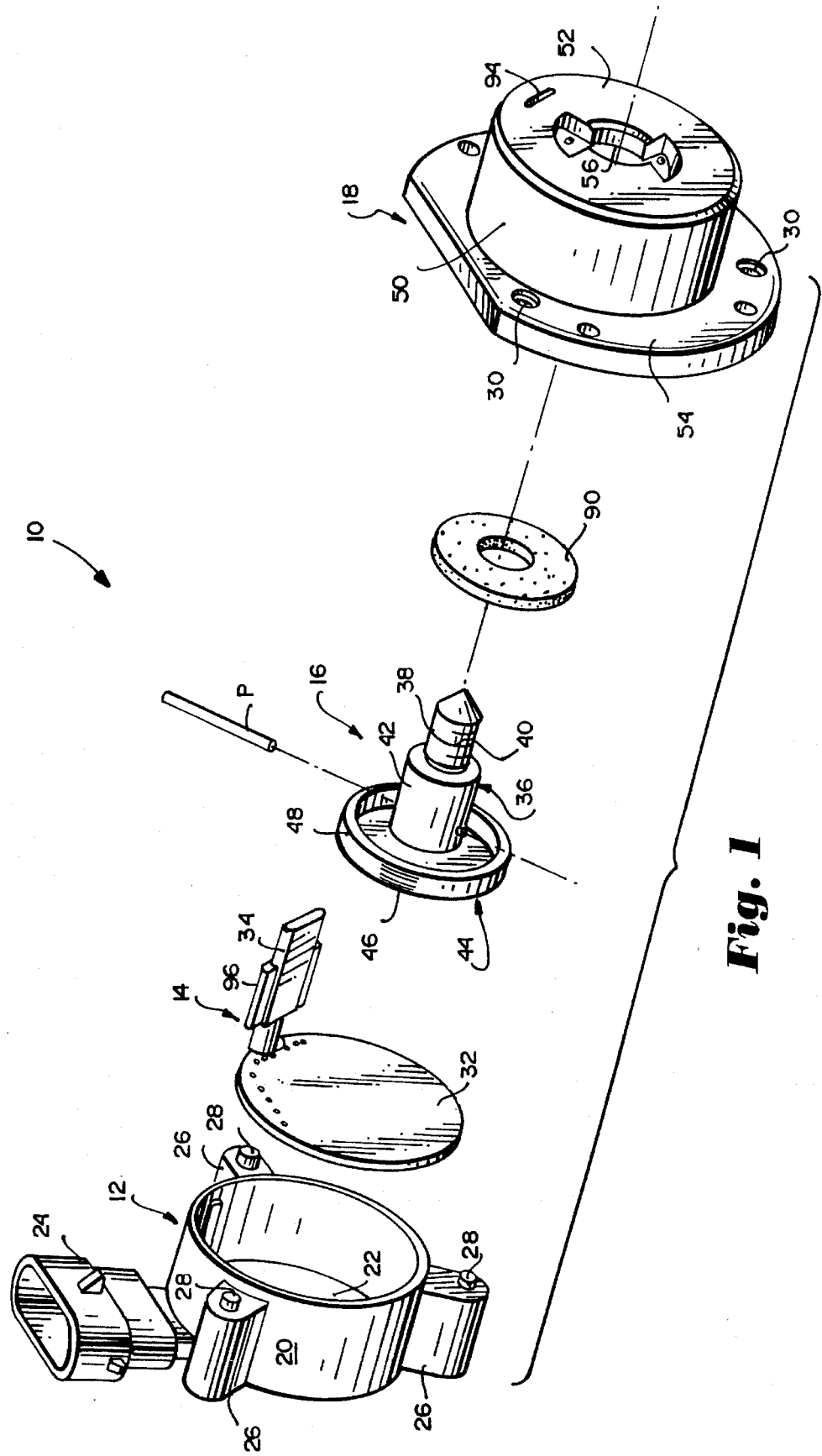
FIG. 1 is an exploded view of a tachometer assembly in accordance with the invention.

With reference initially to FIG. 1, the tachometer assembly 10 of this invention generally includes a tachometer cover 12, a PCB and sensor pad assembly 14, a tachometer shaft and drum assembly 16 and a main body 18.

The cover 12 comprises a cylindrical housing portion 20 with a closure plate 22 at one end, the opposite end being open. A female electrical connector assembly 24 (adapted to mate with a male connector assembly used to connect the encoder to the power and control electronics) is located at the periphery of the housing. The cover 12 also includes three circumferentially spaced mounting flanges or bosses 26, each of which is provided with an axially projecting lug 28 receivable within correspondingly located apertures 30 in the main body portion 18, as described in greater detail hereinbelow.

The sensor pad 14 includes a PCB disc 32 and a sensor pad 34, both adapted for securement in the housing portion 20, in fixed relation thereto.

The shaft and drum assembly 16 includes a multi-diameter shaft 36 including a forward, reduced diameter end 38, with external screw threads 40. A smooth, larger diameter portion 42 of the shaft 36 mounts a drum 44 having sensing indicia, partially shown at 46 on the peripheral surface 48 thereof, for interaction with the fixed sensor pad 34 in a manner similar to that described in commonly owned co-pending application Ser. No. 07/822,016, now U.S. Pat. No. 5,293,125, incorporated herein by reference. A drive pin P extends through the larger diameter portion 42, perpendicular to the longitudinal axis of the shaft 36.

The main body 18 includes a cylindrical portion 50, closed by an integral plate 52 at one end, and open at the opposite end. The open end is surrounded by a radial mounting flange 54, provided with holes 30 which are designed to align with corresponding projecting lugs 28 in the mounting bosses 26 on the cover 12. Thus, upon initial assembly, the cover 12 and main body 18 are secured via engagement of lugs 28 in holes 30, preferably along with the use of an epoxy adhesive, to thereby form the tachometer housing. It will be appreciated that other fastening means such as threaded bolts may also be employed.

Figure 2:
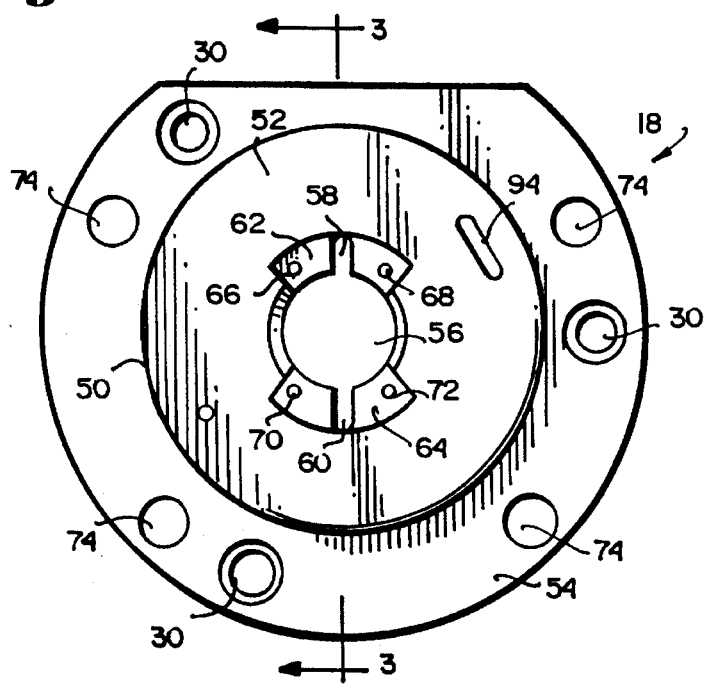
FIG. 2 is an end view of a main body portion of the tachometer assembly illustrated in FIG. 1.
Figure 3:
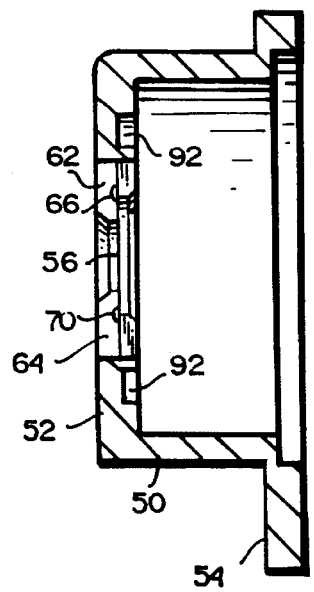
FIG. 3 is a cross sectional side view of the main body portion illustrated in FIG. 2.
Figure 4:
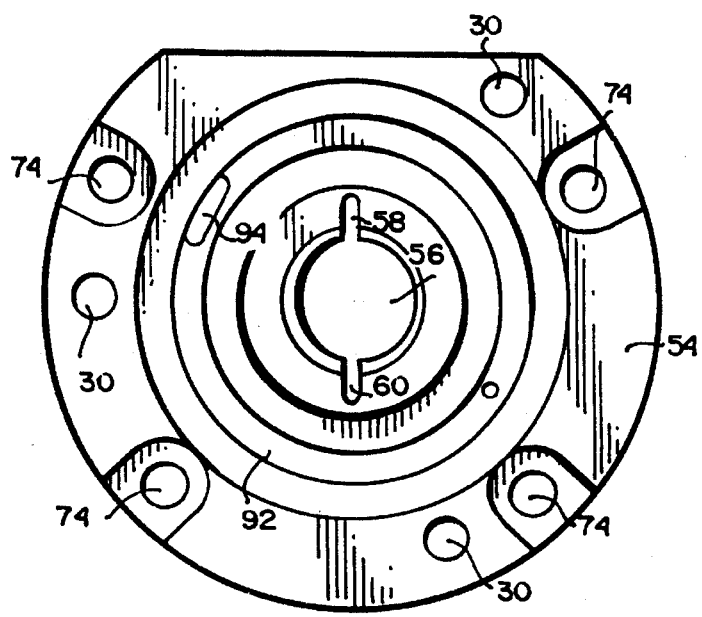
FIG. 4 is an opposite end view of the main body portion illustrated in FIG. 2.
Figure 5:
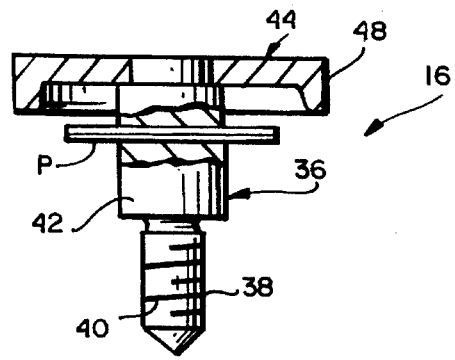
FIG. 5 is a side elevation, partly in section, of the tachometer and drum subassembly shown in FIG. 1.

With reference now also to FIGS. 2–4, the cover assembly end plate 52 has a centrally located aperture 56 which has a radius slightly larger than a corresponding radius of the larger diameter portion 42 of the shaft 36. In addition, the aperture 56 also includes diametrically opposed slots 58, 60. On the exterior side of the end plate 52, there are formed diametrically opposed recesses 62, 64, each of which is centered with respect to slots 58, 60, and each of which extends over an arcuate length of about 90°. Within each recess, on either side of the slots 58, 60, there are provided pairs of axially projecting nubs 66, 68, 70 and 72, respectively, the purpose of which will be explained below.

The radial mounting flange 54 is also provided with four additional apertures 74 which are arranged on the flange 54 so as to align with corresponding apertures on the face of the motor housing to facilitate attachment (by bolts) of the tachometer housing to the motor housing.

Figure 7:
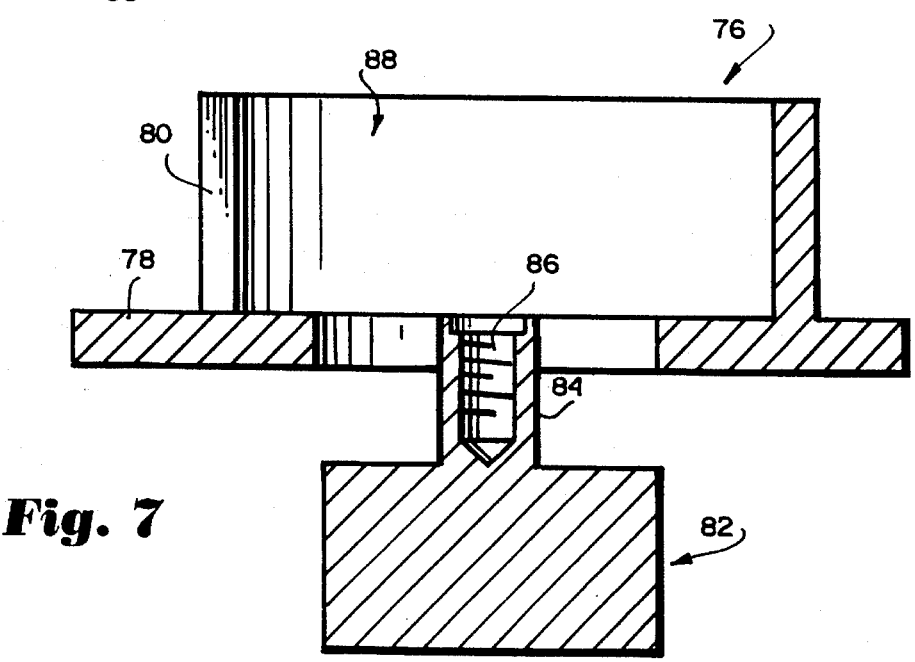
FIG. 7 is a side section of a motor housing and output shaft for use with the tachometer assembly in accordance with the invention.

With reference now to FIG. 7, a typical motor housing 76 is shown to include a front plate 78 including an axially projecting cover or sleeve 80 which has an arcuate extent of about 300°, the open angular space of about 60° designed to accommodate the female connector assembly 24 of the tachometer when the latter is attached to the motor housing 76. The rotor 82 includes a portion 84 which is formed with a threaded bore 86 in its end, for receiving the tachometer shaft 36. It will be appreciated from FIGS. 1 and 7 that the configuration of housing 76 and the blind hole 88 created by sleeve 80, makes it difficult to attach the tachometer assembly 10 to the housing 76, particularly when threaded engagement (as opposed to, for example, a splined engagement) between shaft 36 and rotor 82 is required.

Figure 6:
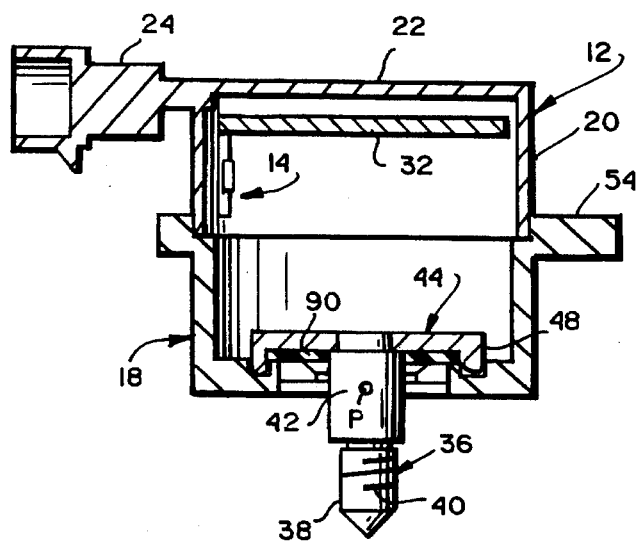
FIG. 6 is a side section of the tachometer assembly shown in FIG. 1, with the tachometer shaft in an installation mode.

To initially set the tachometer assembly for installation, the reduced diameter portion 38 of the shaft 36 is rotated to align the drive pin P with the slots 58, 60, and then pulled forwardly through the aperture 56. Once the pin P is through the aligned slots 58, 60 and aperture 56, the shaft 36 is rotated counterclockwise to cause the pin to ride over the nubs 66 and 72 in opposed recesses 62, 64, respectively. The axial manipulation of the shaft 36 causes an initial resistive bias by reason of the resilient disc spring 90 mounted on the shaft portion 42 and sandwiched between the drum 44 and the interior surface of end plate 52. As the pin P rides over the nubs 66, 72, the spring disc 90 biases the pin P into engagement with the end plate recesses 62, 64 (i.e., in a direction opposite the pulling direction). The tachometer shaft 36 is now releasably locked in an installation mode, facilitating attachment to the rotor 82, as best seen in FIG. 6. In this mode, the drum periphery 48 is partially received within an annular groove 92 formed in the interior surface of end plate 52. It will be appreciated that the extent of axial movement of the sensor drum/shaft assembly 16 within the tachometer housing (comprising cover 12 and main body 18) must be sufficient to enable full threaded engagement between the reduced diameter portion 38 of tachometer shaft 36 and the threaded bore 86 in the rotor 82.

It should be noted that two sets of nubs 68, 70 and 66, 72 have been provided to facilitate easy removal of the tachometer and to accommodate both left and right handed threaded engagement between the tachometer shaft 36 and rotor 82.

Preferably, the tachometer is placed in the installation mode prior to shipment. Upon receipt, the customer simply aligns the shaft 36 with the threaded bore 86 in the rotor 82 and rotates the entire tachometer assembly 10 in, e.g., the clockwise direction for a right hand thread, so that the drive pin P (acting as a wrench) and shaft 36 are caused to rotate in the same direction and into threaded engagement with the rotor bore 86.

Figure 8:
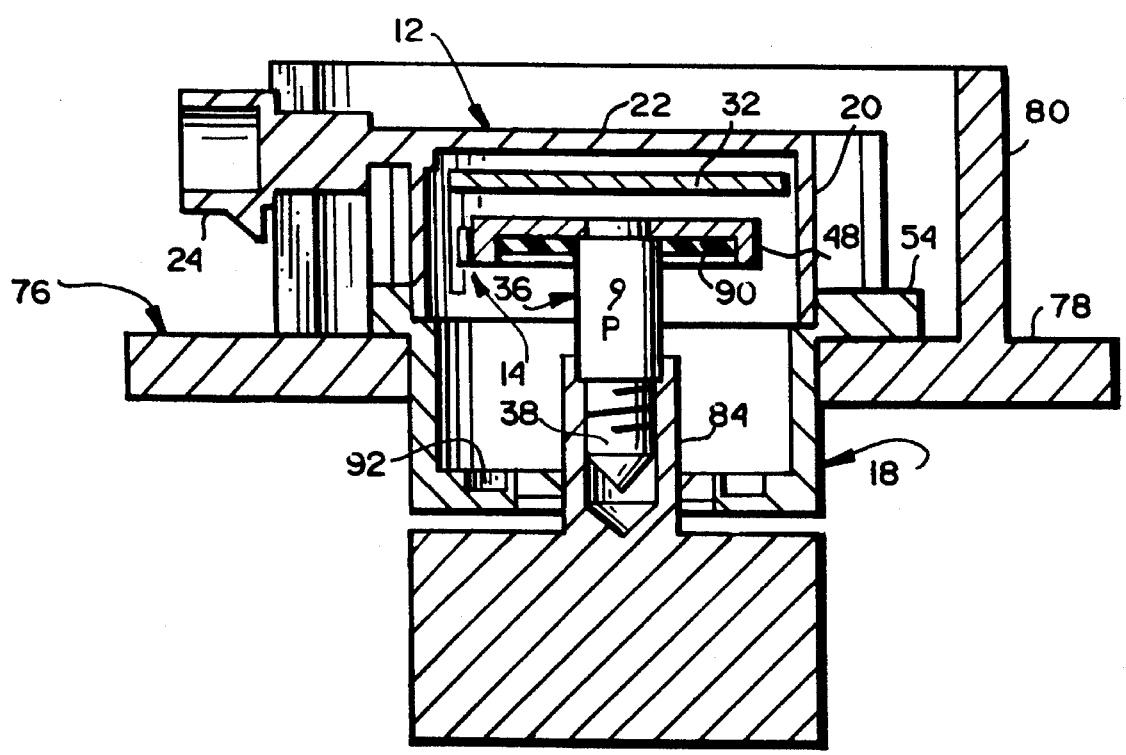
FIG. 8 is a side section illustrating the tachometer assembly in accordance with this invention in an assembled, operative mode with the motor housing illustrated in FIG. 7.

After the tachometer shaft 36 is fully engaged and seated within the bore 86, the tachometer housing may be rotated counterclockwise (relative to the tachometer shaft now tightly engaged with the rotor), causing the drive pin P to ride back over the nubs 66, 72 so that the pin P can be realigned with the slots 58, 60. The tachometer housing may then be pushed forwardly past the drive pin P and into engagement with the motor housing 76, as best seen in FIG. 8. The tachometer housing, and specifically the main body portion 18, may then be bolted to the housing 76 via bolt holes 74, which, as noted above, have been located to align with the motor housing bolt holes (not shown). The shaft and drum assembly 16 is now released from the tachometer housing main body portion 18 so as to be freely rotatable with the rotor 82.

To remove the tachometer, the above steps are carried out in reverse and, in the example given, the second set of nubs 68 and 70 hold the shaft 36 in place during manipulation of the tachometer housing.

With specific reference to FIGS. 2 and 4, an elongated slot 94 is provided in the end plate 52, and specifically within the interior annular groove 92. This groove provides external access to the sensor pad 34 by means of adjustment tool. This enables the sensor pad 34 to be properly positioned axially within its own mounting bracket 96 vis-a-vis the indicia 46 on the drum 44 upon initial assembly of the tachometer, prior to shipment and prior to manipulation of the shaft/drum assembly 16 into the installation mode.

It will thus be appreciated that the above described internal wrench mechanism by which drive pin P is located to cause fixed rotation between the tachometer housing main body portion 18 and the tachometer shaft 36, provides a simple and easy way to attach the tachometer assembly 10 to a rotor 82 of a motor or other rotating machine, even when the rotating machine housing 76 is provided with a blind hole which otherwise prevents attachment by a conventional fastening tool.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In a tachometer assembly for attachment to an output shaft of a rotary machine having a machine housing, wherein the tachometer assembly includes a tachometer housing enclosing a sensor fixed to a tachometer shaft, the tachometer shaft extending from said tachometer housing and adapted for attachment to the output shaft of the rotary machine for rotation therewith, and a sensor pad located peripherally adjacent said sensor; the improvement comprising: internal wrench means including cooperative means mounted on said tachometer shaft and on said tachometer housing, respectively, for locking said tachometer shaft to said tachometer housing and thereby preventing relative rotation therebetween so as to facilitate engagement between said tachometer shaft and said output shaft, and for unlocking said tachometer shaft from said tachometer housing to thereby permit relative rotation therebetween and to permit said tachometer shaft to rotate with said output shaft after said tachometer housing is secured to the rotary machine.

2. The improvement of claim 1 wherein said tachometer housing includes a cylindrical cover portion and a cup-shaped main body portion, said main body portion having a radial flange at one end thereof and adapted for engagement with said cylindrical cover portion, and an end wall opposite said one end, and further wherein said internal wrench means includes a round opening having diametrically opposed slots extending therefrom.

3. The improvement of claim 2 wherein said internal wrench means further includes a drive pin extending in opposite directions from said tachometer shaft and substantially perpendicular to said tachometer shaft.

4. The improvement of claim 3 wherein each of said diametrically opposed slots is centered within a respective one of a pair of arcuate recesses, with a pair of locking nubs projecting from each one of said pair of arcuate recesses, said drive pin adapted to pass through said slots and to be rotated within said pair of arcuate recesses and past one of said pair of locking nubs in each of said pair of arcuate recesses to thereby cause said cup-shaped main body portion and said tachometer shaft to thereafter rotate together.

5. The improvement of claim 4 and further including means for permitting said tachometer shaft to move forwardly towards said end wall against a resilient opposing bias.

6. The improvement of claim 5 wherein said resilient opposing bias is provided by a resilient spring disc.

7. The improvement of claim 3 wherein said tachometer shaft includes a threaded, reduced diameter portion and an axially adjacent smooth enlarged diameter portion, and wherein said drive pin extends through said smooth enlarged diameter portion.

8. The improvement of claim 2 wherein said sensor pad is adjustable relative to said sensor via an aperture provided in said main body portion.

9. A tachometer assembly for attachment to a rotor of a rotary machine comprising: a tachometer housing enclosing a sensor and a sensor pad, the sensor fixed to a tachometer shaft projecting from the tachometer housing, said tachometer shaft provided with a transverse drive pin engageable within a pair of recesses formed in said tachometer housing so as to temporarily rotationally and axially lock said tachometer shaft to said housing in an installation mode, said drive pin also disengageable from said pair of recesses so as to release said tachometer shaft for rotation relative to said tachometer housing in an operative mode.

10. The tachometer assembly of claim 9 wherein said tachometer assembly includes a main body portion having an end plate, said recesses formed within an exterior surface of said end plate and centered around a hole through which said tachometer shaft projects, and wherein a pair of diametrically opposed through slots open with said hole to permit axial passage of said drive pin through said end plate and into said recesses.

11. The tachometer assembly of claim 10 wherein a plurality of projecting nubs are provided in said recesses to facilitate locking of said tachometer shaft in said installation mode.

12. The tachometer assembly of claim 10 including means for resiliently biasing said tachometer shaft against said axial passage.

13. A tachometer assembly including a tachometer shaft projecting in an axial direction from a tachometer housing and adapted for attachment to an output shaft of a rotary machine, said assembly including means for permitting: (1) sequential axial and rotational movements of said tachometer shaft in respective first axial and rotational directions relative to said tachometer housing to a first installation position where said tachometer shaft and said tachometer housing are axially and rotationally fixed, and wherein said tachometer shaft axially projects beyond said tachometer housing to a degree greater than when said tachometer shaft is in an operative position; and (2) sequential rotational and axial movements of said tachometer housing relative to said tachometer shaft in respective second axial and rotational directions opposite to said first axial and rotational directions to said operative position wherein said tachometer shaft is freely rotatable and wherein said tachometer shaft axially projects beyond said tachometer housing to a degree less than when said tachometer shaft is in said installation position.

14. The assembly of claim 13 wherein said tachometer housing includes a cylindrical cover portion and a cup-shaped main body portion, said main body portion having a radial flange at one end thereof and adapted for engagement with said cylindrical cover portion, and an end wall opposite said one end and wherein said internal wrench means includes a round opening with diametrically opposed slots extending therefrom formed in said end wall.

15. The assembly of claim 14 wherein said internal wrench means further includes a drive pin extending in opposite directions from said tachometer shaft and in a direction substantially perpendicular to a longitudinal axis of said tachometer shaft.

16. The improvement of claim 15 wherein each of said diametrically opposed slots is centered within a respective one of a pair of arcuate, with a pair of locking nubs projecting from each one of said pair of arcuate recesses, said drive pin adapted to pass through said slots and to be rotated within said pair of arcuate recesses and past one of said pair of locking nubs in each of said pair of arcuate recesses to thereby cause said cup-shaped main body portion and said tachometer shaft to thereafter rotate together.

\* \* \* \* \*

UNITED STATES PATENT AND TRADEMARK OFFICE
CERTIFICATE OF CORRECTION

PATENT NO. : 5,495,758
DATED : March 5, 1996
INVENTOR(S) : GRIFFEN et al.

It is certified that error appears in the above-indentified patent and that said Letters Patent is hereby corrected as shown below:

On the title page item [75], change "Mark Azyenberg" to read --Mark Ayzenberg--.

Signed and Sealed this

Twenty-fourth Day of June, 1997

*Attest:*

*Attesting Officer*

BRUCE LEHMAN

*Commissioner of Patents and Trademarks*